UNITED STATES PATENT OFFICE.

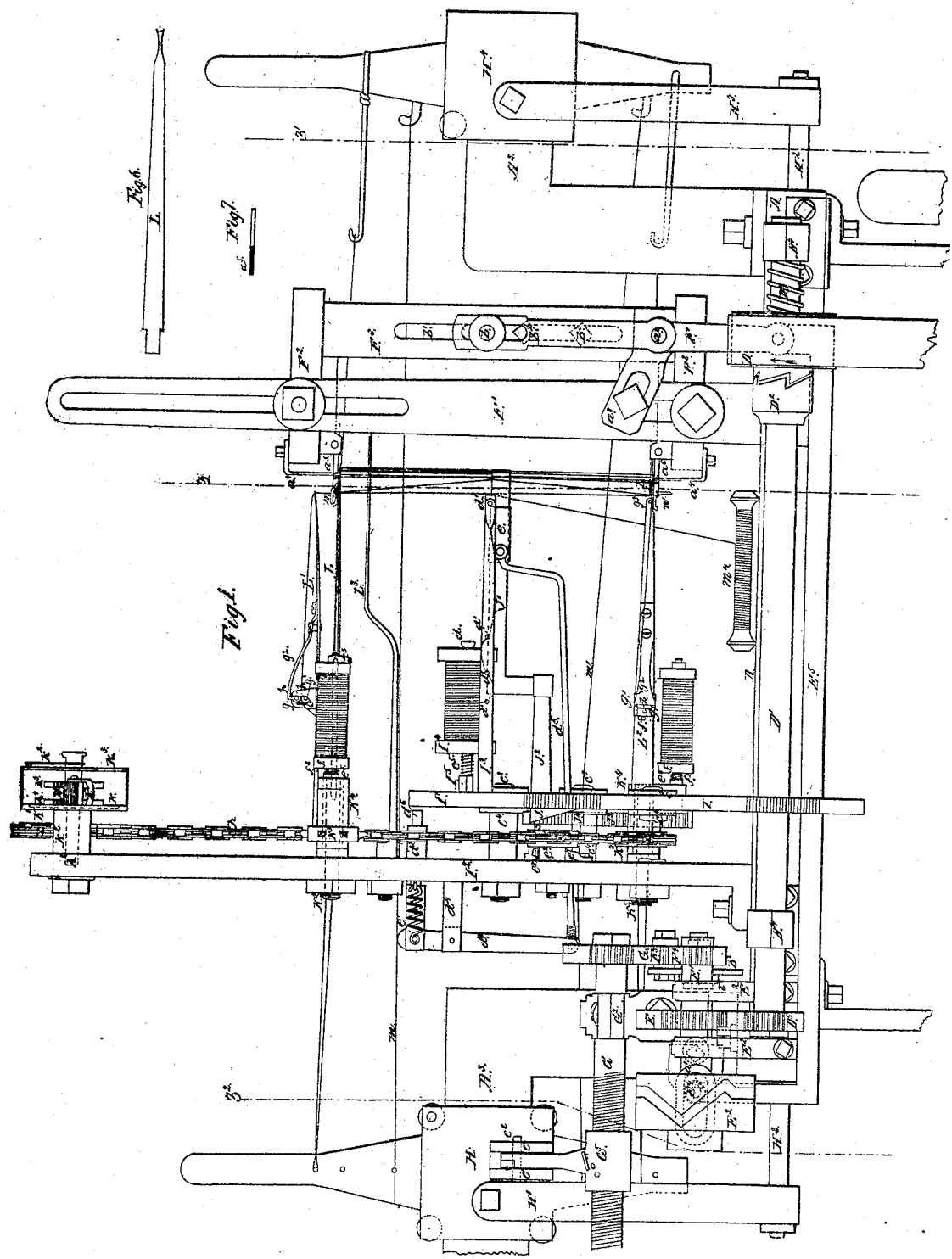
D.C. Brown.
Knitting Mach.
Nº 9,584.
Patented Feb. 15, 1853.

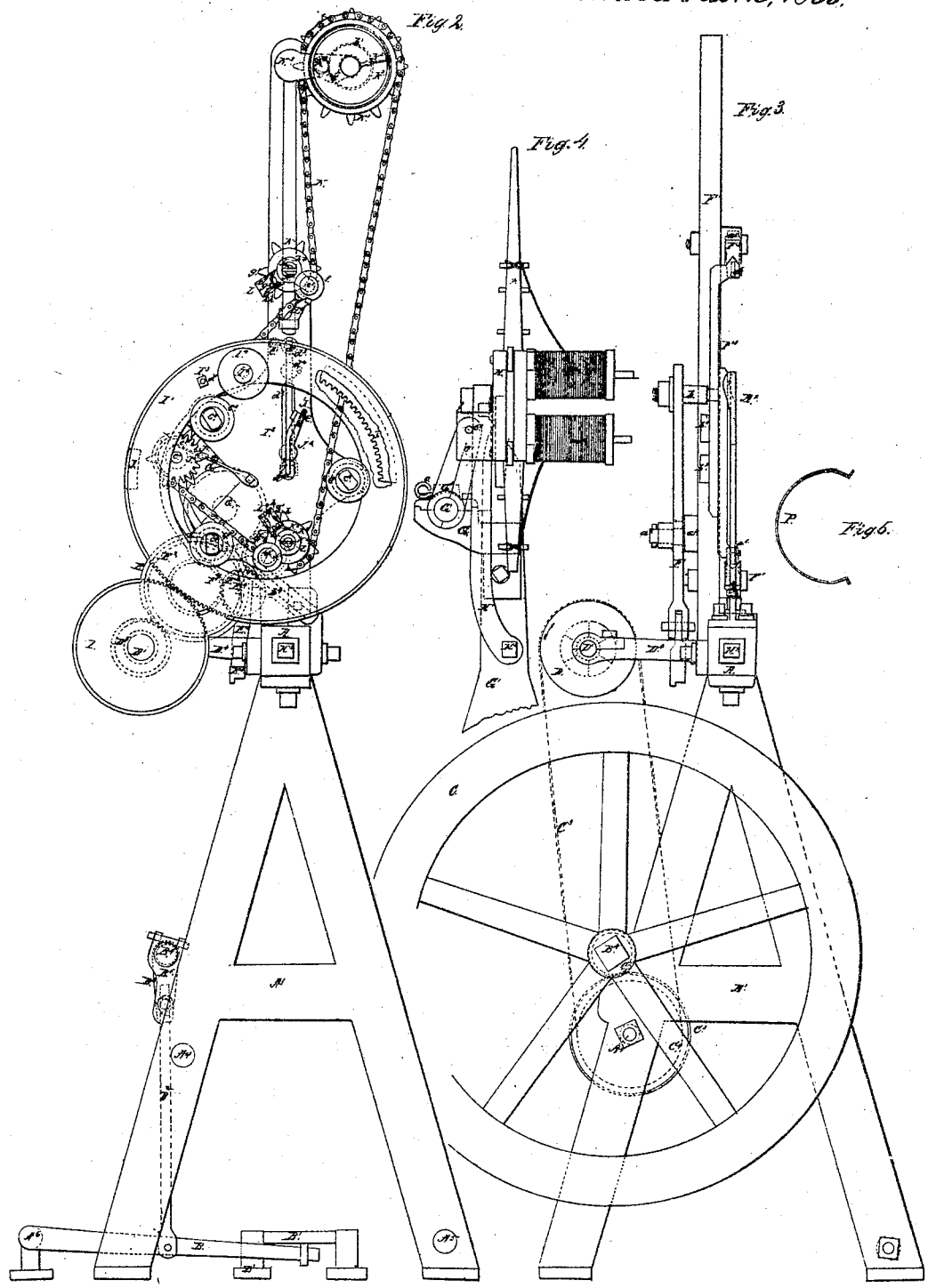

DARIUS C. BROWN, OF LOWELL, MASSACHUSETTS.

MACHINE FOR MANUFACTURING HARNESSES FOR LOOMS.

Specification of Letters Patent No. 9,584, dated February 15, 1853.

*To all whom it may concern:*

Be it known that I, DARIUS C. BROWN, of Lowell, in the county of Middlesex and State of Massachusetts, have invented a new and useful Machine for Knitting Weaver's Harnesses for Power and other Looms; and I do hereby declare that the same is described and represented in the following specification and accompanying drawings.

To enable others skilled in the art to make and use my invention I will proceed to describe its construction and operation in connection with the accompanying drawings, of which—

Figure 1, is an elevation of one side of the machine. Fig. 2 is a section through the line $z$ $z$ of Fig. 1 showing the parts at the left hand of said line. Fig. 3, is a section through the line $z'$ $z'$ of Fig. 1, showing the parts at the left of said line and to the right of the line $z$ $z$. Fig. 4, is a section through the line $z^2$ $z^2$ of Fig. 1, showing the upper part of the end stand $G^4$ which supports the end of the rail $A^3$ and the stand $G^3$ fastened to $G^4$ which supports the end of the screw $G'$. The lower part of the stand $G^4$ is like the stand $A'$. Fig. 5 is a spring used to hold the lease lines open to facilitate putting the shafts into the harness. Fig. 6, is a top view of the temple L. Fig. 7 is a top view of the needle $a^5$.

The same letters refer to the same parts in each drawing; and where one part is obscured by another part of the machine, the same letter may be repeated upon it.

A is a hollow bar supported by two stands $A'$ $A'$ which has the rails $A^2$ and $A^3$ fastened to it: the opposite ends of these rails are supported by stands the upper portion of one is represented in Fig. 4. The stands $A'$ $A'$ are connected together by the rails $A^4$ $A^5$. The lever B vibrates in the stand $A^6$ fastened to the floor; and is acted upon by the treadle $B'$ vibrating in the stands $B^7$ fastened to the floor which treadle extends under the machine to a convenient position for the foot of the operator to propel the machine. The rod $B^2$ is connected to the lever B and to the crank $B^3$ upon the shaft $B^4$ which turns in the boxes $B^5$ $B^5$ upon the stands $A'$ $A'$. The fly wheel C is upon the opposite end of the shaft $B^4$ which shaft has the gear $C^2$ fastened to it that turns the gear $C^3$ fastened to the pulley $C^4$ both of which turn upon the rod $A^4$. The pulley $C^4$ carries the belt $C^5$ which turns the pulley D (upon the shaft $D'$) which pulley has a hub with a series of teeth upon it which fit the teeth on the collar $D^2$ fastened to the shaft $D'$ so that when the pulley D is turned in the direction indicated by the arrow it turns the shaft and operates the machine. But if the pulley D is turned the other way the series of teeth slip by each other so as not to turn the machine backward. The pulley D is pressed against the collar $D^2$ by the spiral spring $D^3$. The shaft $D'$ turns in the stands $D^4$ $D^4$ fastened to the bar A, and has the gear $D^5$ upon it that drives the gear E and turns the shaft $E'$ in the boxes $E^2$ $E^2$ fastened to the bar A. The cam $E^3$ upon the shaft E traverses the stud $E^4$ in the connecting rod $E^5$ the opposite end of the stud $E^4$ traverses in the roller $a$ in the stand $a'$ fastened to the upright part of the rail $A^3$. The opposite end of the rod $E^5$ is connected to and vibrates the lever F upon the stud $a^2$ in the slide $a^3$ fastened to the stand $F'$ which stand is bolted to the bar A. The grooved ways $F^2$ $F^2$ are fastened to the stand $F'$ and the rests $a^4$ $a^4$ in which the needles $a^5$ and $a^6$ traverse are fastened to them. The sliding frame $F^3$ traverses in the ways $F^2$ $F^2$ to operate the needles $a^5$ $a^6$ fastened to it; it being traversed by the stud $b$ in the lever F which works in the grooves $b'$. The sliding frame $F^3$ is made in two parts and fastened together by the bolts $b^2$ $b^2$ so as to adjust it for harnesses of different widths. The gear $F^4$ on the shaft $E'$ drives the stud wheels $F^5$ $F^5$ which turn on studs in the slide $b^3$ which is fastened to the slide $b^4$ which is fastened to the stand $b^5$ bolted to the rail $A^3$. The gears $F^5$ turn the gear G and screw $G'$ which rotates in the stand $G^2$ fastened to the rail $A^3$ and the stand $G^3$ fastened to the stand $G^4$ Fig. 4. The screw $G'$ traverses the nut $G^5$ which is made in two parts held together by the screw $c$. The projection on the nut $G^5$ is fastened between the cheeks $c'$ $c'$ upon the carriage H by the pin $c^2$ to traverse it.

The stand $H'$ is fastened to carriage H, and the rod $H^2$ is fastened to its lower end and extends through the bar A, and the opposite end is fastened to the stand $H^3$ which stand is fastened to the carriage $H^4$ so as to make it traverse in connection with the carriage H. The gear I on the shaft $D'$ drives the gear circle $I'$ which revolves upon the grooved rollers $c^3$ $c^3$ $c^3$ which turn on the studs $c^4$ $c^4$ $c^4$ fastened into the stand $I^2$ which stand is bolted to the bar A. The circle $I'$ carries the arm $I^3$ which is fastened into it to deliver the twine from the spool $I^4$ which turns on the stud $I^5$ fastened into the circle I. The spool $I^4$ is forced against the spiral spring $c^5$ by the nut $d$ so that the spool may not deliver the twine too freely into the holes $d'$, $d'$, $d'$, $d'$, in the arm $I^3$. The cam J on the circle $I'$ pushes back the slide $d^6$ in the tube $d^2$ fastened into the stand $I^2$ and vibrates the lever $d^3$ upon a pin in the stand $d^4$ from the stand $I^2$; the lower end of the lever $d^3$ embraces a nut upon the rod $d^5$ which rod extends through the stand $I^2$ and circle $I'$ and is connected to the slide $e$, to traverse it upon the eye rod $J'$ fastened to the stud $J^2$ which is fastened to the stand $I^2$; after the cam J passes the slide $d^6$ the spiral spring $e'$ fastened to it and to the stand $I^2$ draws it in again and pulls back the slide $e$. The toothed segment $J^3$ on the circle I turns the wheel $J^4$ on the stud $e^2$ fastened into the stand $I^2$. The wheel $J^4$ is fastened to the sprocket wheel $J^5$ which has the pin $e^3$ in it which is caught in a recess in the spring $e^4$ to stop the wheel $J^4$ as soon as the segment $J^3$ ceases to act upon it. The wheel $J^5$ carries the chain K and drives the wheel $K'$ and turns the shaft $h'$ in the stand $K^2$ fastened to the top of the stand $I^2$. The chain K also turns the wheels $K^3$ $K^3$ upon the flier tubes $K^4$ $K^4$ which turn on the hollow studs $K^5$ $K^5$ fastened into the stand $I^2$. The temples L L fastened into the studs $K^5$ $K^5$ one of which extends under the needle $a^5$ and the other over the needle $a^6$ as represented in the drawing. The spindles $e^5$ $e^5$ are fastened into the projections on the tubes $K^4$ $K^4$ and the spools $f$ $f'$ are upon them, and are adjusted against the spiral springs $f^2$ $f^2$ by the nuts $f^3$ $f^3$. The fliers $L'$ $L^2$ are fastened to the tubes $K^4$ $K^4$ and extend out so as to deliver the twine from the spools $f$ $f'$ onto the throats of the needles $a^5$ $a^6$, when they are shoved forward. The twine represented by a red line is drawn from the spool through the holes in the fliers one of which is represented $f^5$ and through the guides $g$ $g$ in the stands $g'$ $g'$ which stands are fastened to the fliers, and have two rollers $h$ $h$ in them pressed together by the springs $g^2$ $g^2$ fastened to the fliers and adjusted by the screws which pass through them into the fliers. The twine after it leaves the guide $g$ passes between the rollers $h$ $h$ and through the holes in the ends of the fliers one of which is seen at $g^3$. The swaying bar $L^3$ is fastened into the stand $I^2$ and extends nearly to the stand $F'$. The wheel $K'$ turns the shaft $h$ which has the arm $h^2$ fastened to it which forms the bearings of the pinion $h^3$ which gears into the gears $h^4$ and $h^5$; the gear $h^4$ is fastened to the circle $k$ of the stand $K^2$ and has one more tooth in it than the wheel $h^5$ which turns loose on the shaft and is connected to the hand $k^2$ so as to count the work performed and show the quantity upon the index $k^3$ which has a rim upon it that extends back over the gears and fits onto the circle $k$ which holds it in its proper place. The rollers $h$ $h$ deliver the twine uniformly without disturbing the twist as every device tried except the rollers run the twist back and made the twine kink so as to disturb the operation of the machine by breaking the twine and causing delay.

A stand similar to the stand $G^4$ is required to support the end of the rail $A^2$.

The machine having been constructed and completed as above described, I put on the lease lines $m$ by putting it through the slot in the stand $I^2$ under the swaying bar $L^3$, and the lease lines $m'$ by putting it through the slot in the stand $I^2$ under the stud $J^2$, both which lines are fastened to the carriages H and $H^4$ as represented in the drawing. I then take the end of the twine from the spool $m^2$ and put it through the hole in the stud $K^5$ putting one thread of twine above and the other below the temple L and fasten it to the hook on the carriage $H^4$. I then take the part next to the spool and draw it tight and belay it around the pin in the carriage H, for the upper back band of the harness. I then take the ends of the twine from the spool $m^3$ and put it through the lower stud $K^5$ putting one strand above and the other below the temple and fasten it to the carriages in the same way I did the upper back band, which forms the lower back band. I then fill the spool $I^4$ with twine and put the end through the holes $d'$, $d'$, $d'$, $d'$ in the arm $I^3$ and take it down around the needle $a^6$ and fasten it to the back band. I then fill the spool $f'$ and thread the end through the hole $f^5$ and guide $g$ and pass it between the rollers $h$, $h$ and through the hole $g^3$ and around the needle $a^6$ and fasten it to the back band. I then fill the spool $f$ and thread the flier $L'$ in the same way I threaded the flier $L^2$ and pass the twine around the needle $a^5$ and fasten it to the upper back band. I then fill the hand quill $m^4$ and fasten the end of the twine to the upper back band. Everything being now ready for operation I apply my foot to the treadle $B'$ and turn the shaft $B^4$ and gear $C^2$ which drives $C^3$ with the pulley $C^4$ which drives the pulley D with the shaft $D'$ and gear $D^5$ which drives the wheel E and shaft $E'$ with the cam $E^3$ which traverses the rod $E^5$ which vibrates the lever F and traverses the frame $F^3$ with the needles $a^5$ and $a^6$ to knit the back bands of the harness. The shaft $D'$ turns the gear I which drives the circle $I'$ which carries the arm $I^3$ and winds the twine from the spool $I^4$ around the rod J' and needle $a^6$ and makes the loops for the lower part of the harness. The segment $J^3$ on the circle I' turns the wheel $J^4$ with the sprocket wheel $J^5$ once around which carries the chain K which turns the wheels $K^3$ $K^3$ once around with the fliers L', $L^2$ which fliers carry the twine from the spools $f$ and $f'$ and wind it around the back bands and the needles $a^5$, $a^6$. As the machine is put in motion the fliers L', $L^2$ carries the twine around the back bands and the needles $a^5$, $a^6$ and stop as the pin $e^3$ is caught by the recess in the spring $e^4$ and the arm $I^3$ carries the twine up, and while it is passing through the upper part of its orbit I pass the quill $m^4$ over the needle $a^5$ and down under the rod J' to the left of the twine from the arm $I^3$ (so as to pass it through the loop which is being made by the twine carried by said arm) and tie a knot by passing the quill around the twine which was delivered by the quill as it was carried down, and draw the knot down close to the top edge of the rod J' to form the eye. The needles $a^5$, $a^6$ are then pushed out to shove the ends of the tongues $n$, $n'$ through the stitches when the needles are drawn back through the stitches which turn the tongues over onto the barbs, so that the first stitches are held forward by the rests $a^4$, $a^4$ and the first stitches slip off of the needles, while the stitches knit last are caught by the barbs under the tongues and when the needles are pushed forward again they are held by the temples L, L so that the needles slip forward through them and they take the place of the first stitches turning the tongues back and holding them, while the twine for the next stitches is carried around the needles. As the circle I' turns it carries the cam J against the slide $d^6$ forcing it back and moving the lever $d^3$ so as to move the rod $d^5$ and slide $e$ toward the end of the rod J to slip the eye and loop back so as to be out of the way of the next loop and eye. After the cam J passes the slide $d^6$ it is drawn back by the spring $e'$ which moves the slide $e$ back also. In the meantime the wheel $F^4$ on the shaft E' has turned the gears $F^5$, $F^5$ and G with the screw G' which has moved nut $G^5$ and carriages H and $H^4$ with the back bands a proper distance, so as to place the next loop and eye the required distance from the previous ones. And if the machine is kept in operation and the attendant carries the quill as above described and ties the knots to form the eyes the machine forms the loops and knits the upper and lower back bands to make the harness of the length required, which is indicated by the hand $k^2$ upon the index $k^3$ when I cut the twine from the arm $I^3$ fliers L', $L^2$ and quill and fasten the ends around the back bands, and spread the lease bands and put the springs (like P, Fig. 5) in to hold them open while I put in the harness shafts and cut off the back bands. I then remove the springs P and slip the lease bands off of the hooks on the carriage $H^4$ and pull them out of the harness and then fasten the back bands to the ends of the shafts which completes the harness. The swaying bar $L^3$ presses one-half of the loops from the eyes out of a direct line from the rod J' to the needle $a^5$ which makes them longer than the others so as to throw the back band one side of the center of the harness shaft out of the way of the staples in the shaft. The distance between the loops upon the back bands may be varied by changing one of the wheels (or gears) $F^4$ or G, or both of them as may be most convenient.

To make the harness wider the slide $F^2$ is raised up and the frame $F^3$ shoved apart, and the flier stud $K^5$, swaying bar $L^3$ and stud $J^2$ may be moved also and adjusted as required. If it is desirable to reduce the width of the harness the several parts above mentioned may be moved in the opposite direction.

The stand $K^2$ may be moved up or down to tighten or loosen the chain K when necessary.

I contemplate that a rod nearly round with a sharp corner so as to tie the eyes uniformly may be used instead of the rod J'.

What I claim as my invention and desire to secure by Letters Patent is—

1. The fliers L', $L^2$ constructed with a spring nose or its equivalent, so as to yield the twine when the needles draw the stitches into the rest; and to take up the binding twine or draw it tight when the stitches slip off of the needles.

2. The apparatus or its equivalent for shoving the eyes off of the rod J', consisting of the cam J, slide $d^6$, lever $d^3$, rod $d^5$, and slide $e$.

3. The revolving spring nose flier L or its equivalent, in combination with the needle $a^5$ or its equivalent for the purposes set forth substantially as described.

In testimony whereof I have hereunto signed my name before two subscribing witnesses.

DARIUS C. BROWN.

Witnesses:
 Isaac S. Morse,
 Sam V. Hadleyth.